Jan. 7, 1958     G. J. LANG     2,819,097
HOSE COUPLING WITH FLUID PRESSURE RESPONSIVE LOCKING MEANS
Filed Feb. 15, 1957     2 Sheets-Sheet 1
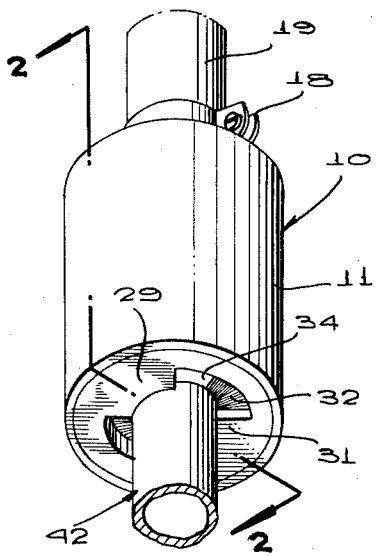
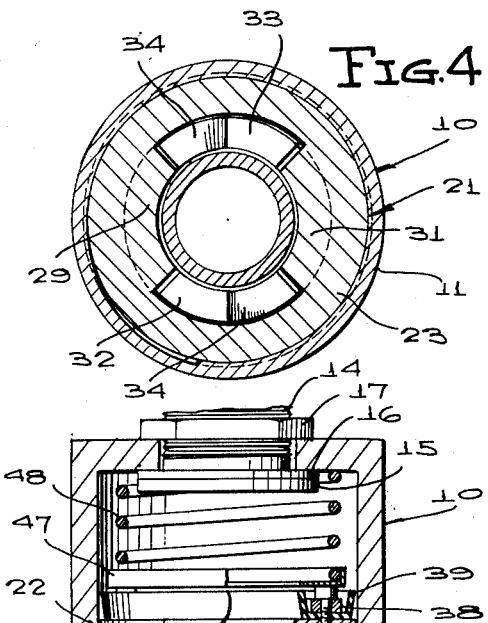
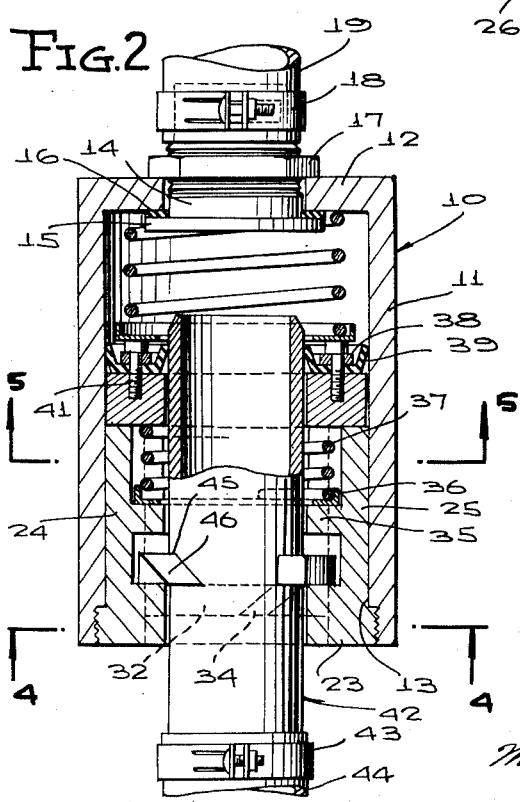
INVENTOR.
GEORGE J. LANG
BY
McMorrow, Berman & Davidson
ATTORNEYS Jan. 7, 1958 G. J. LANG 2,819,097
HOSE COUPLING WITH FLUID PRESSURE RESPONSIVE LOCKING MEANS
Filed Feb. 15, 1957 2 Sheets-Sheet 2
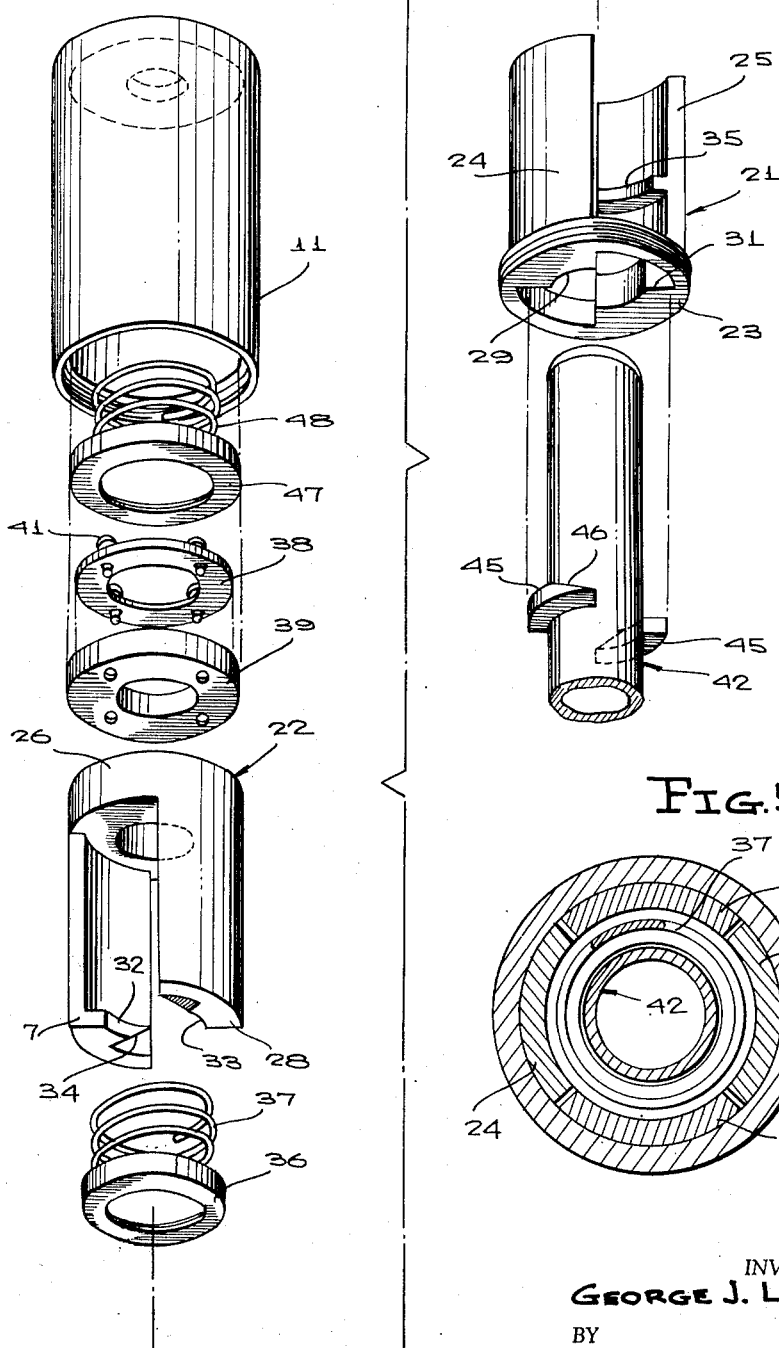
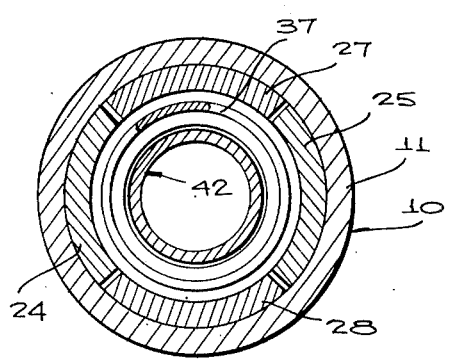
INVENTOR.
GEORGE J. LANG
BY
McMorrow, Berman & Davidson
ATTORNEYS

United States Patent Office 2,819,097
Patented Jan. 7, 1958

2,819,097

HOSE COUPLING WITH FLUID PRESSURE RESPONSIVE LOCKING MEANS

George J. Lang, Fresno, Calif.

Application February 15, 1957, Serial No. 640,558

4 Claims. (Cl. 285—81)

The present invention relates to a connector for a high-pressure air hose.

An object of the present invention is to provide a hose connector which lends itself to rapid connection and disconnection of hose sections in a high-pressure air line such as is used with pneumatic air hammers and other air operative tools.

Another object of the present invention is to provide a hose connector for an air line which cannot be disconnected while pressure is on the line.

A further object of the present invention is to provide an air hose connector which enables one end portion of the connector to be rotated through a full 360 degrees with respect to the other end portion, thus decreasing the tendency of an air hose to form kinks.

A still further object of the present invention is to provide a hose connector for a high-pressure air line which is simple in structure and sturdy in construction, one economical to manufacture and assemble, and one which is highly effective in action.

These and other objects and advantages of the present invention will be fully apparent from the following description when taken in connection with the annexed drawings, in which:

Figure 1 is a view in perspective showing the air hose connector of the present invention in assembled condition;

Figure 2 is a sectional view, on an enlarged scale, taken on the line 2—2 of Figure 1;

Figure 3 is a sectional view, similar to Figure 2, but showing the air hose connector in disconnected condition;

Figure 4 is a sectional view taken on the line 4—4 of Figure 2;

Figure 5 is a sectional view taken on the line 5—5 of Figure 2; and

Figure 6 is a perspective exploded view of the components of the hose connector according to the present invention.

Referring in greater detail to the drawings in which like numerals indicate like parts throughout the several views, the hose connector according to the present invention is designated generally by the reference numeral 10 and includes a hollow casing 11 having a closed end 12 and an open end 13. A nipple 14, having a flange 15 on one end thereof, extends through the closed end 12 of the casing 11 with the flange 15 separated from the inner wall of the closed end 12 by a resilient washer 16. A nut 17 is threadedly engaged upon the threaded exterior portion of the nipple 14 and securely holds the nipple 14 in its position extending through the closed end 12 of the casing 11.

A split ring clamp 18, together with the nipple 14, provides means for attachment of a hose 19 carrying a supply of fluid under pressure.

Referring to Figures 5 and 6, a sleeve having two parts designated generally by the reference numerals 21 and 22 is shown. The part 21 has an annular head portion 23 with spaced opposed sleeve segments 24 and 25 projecting perpendicularly from one side of the head portion 23. The part 22 also has an annular head portion 26 with sleeve segments 27 and 28 projecting perpendicularly from the adjacent side of the part 22. The sleeve segments 24, 25, and 27, 28, of the parts 21 and 22 when positioned within the casing 11 interengage each other to form a sleeve with the head portion 26 on the one end of such sleeve adjacent and spaced from the closed end 12 of the casing 11 and with the head portion 23 of the part 21, on the other end of such sleeve, positioned inwardly of and adjacent the open end 13 of the casing 11. The head portion 23 is provided with exterior threads threadedly engageable with internal threads formed in the lower end portion of the casing 11. The threads on the inner wall of the casing 11 adjacent the open end 13 and on the exterior surface of the head portion 23 of the part 21 form a means for detachably and fixedly connecting the one sleeve part 21 to the casing 11.

As shown most clearly in Figures 1, 4, and 6, the head portion 23 of the sleeve part 21 is provided with a pair of opposed flanges 29 and 31 arranged in spaced relation and extending about the inner wall of the sleeve part 21 adjacent the open end 13 of the casing 11 when the sleeve formed by the parts 21 and 22 are positioned within the casing 11.

The other part 22 of the sleeve is provided with inwardly projecting flanges 32 and 33, each extending partially about the sleeve part 22 and projecting inwardly from the sleeve part 22 adjacent the open end of the casing 11 when the sleeve formed by the parts 21 and 22 are positioned within the casing 11.

In Figure 3, it will be seen that the flange 32 is in the position out of coplanar relationship with respect to the flanges 29 and 31, this being a sectional view and the flange 33 not being shown.

The sleeve parts 21 and 22 are slidably movable with respect to each other so that the flanges 32 and 33 of the part 22 are movable from the out of coplanar relationship with respect to the flanges 29 and 31 to a position (Fig. 2) in which such flanges 32 and 33 are coplanar with the flanges 29 and 31, the flange 32 being indicated in dotted lines in Figure 2. Each of the flanges 32 and 33 have cam surfaces, the cam surface of the flange 32 being the only one shown and represented by the reference numeral 34 in Figures 2, 3 and 6.

The inner surfaces of each of the sleeve segments 24 and 25 of the sleeve part 21 are each provided with a shoulder 35 on which rests a spring retaining ring 36 which receives one end of a coil spring 37. The other end of the coil spring 37 bears against the inner face of the head portion 26 of the sleeve part 22 and constitutes spring means biasing the sleeve part 22 to the position in which the flanges 32 and 33 are out of coplanar relationship with respect to the flanges 29 and 31 on the sleeve part 21.

An annular piston embodying a ring 38 and an annular resilient cup-shaped member 39 having the ring 38 in abutting relation with respect to the bottom of the member 39 is positioned within the casing 11 between the head portion 26 of the sleeve part 22 and the closed end 12 of the casing 11. Cap screws 41 (Figs. 2 and 3) secure the ring 38 and the cup-shaped member 39 to the exterior face of the head portion 26 of the sleeve part 22 for movement with the sleeve part 22.

A male coupling element, embodying a hollow tubular member 42 has one end provided with a split clamp 43 for attaching a discharge hose 44 thereto. A portion adjacent the other end of the tubular member 42 is insertable through and withdrawable from the casing open end 13 between the flanges 29, 31 and 32, 33. The portion of the tubular member 42 remote from the clamp 43, when the tubular member 42 is inserted within the casing 11, extends through and is spaced from the ring 38 and the cup-shaped member 39 with the cup-shaped member 39 sealingly engaging the adjacent end portion of the tubular member 42 and the inner wall of the casing 11.

A pair of opposed ledges 45 extend partially around the exterior of the portion of the tubular member 42 adjacent the end which is sealingly engaged by the cup-shaped member 39 when inserted within the casing open end 13 and each ledge 45 has a cam surface 46 (Figs. 3 and 6) which cooperates with the cam surface 34 on the adjacent one of the flanges 32 or 33 of the sleeve part 22 to lift the flange 32 or 33 upon rotation of the tubular member 42 in the reverse direction after the end portion of the tubular member 42 has been inserted into the casing open end 13 and rotated in one direction to a position in which the ledges 45 are wholly within the casing 11 and ride on or are abuttingly supported by the flanges 29 and 31 of the sleeve part 21.

In operation, upon admission of air or other fluid under pressure through the hose 19 and associate nipple 14 into the end of the casing 11 adjacent the closed end thereof, the piston formed by the cup-shaped member 39 and ring 38 effects the movement of the flanges 32 and 33 of the sleeve part 22 from the position in which they are out of coplanar relationship with respect to the flanges 29 and 31 of the sleeve part 21 to a position in which they occupy the spaces between the flanges 29 and 31 and in which they are coplanar with such flanges. In such position, the inner surfaces of the flanges 32 and 33 present no obstruction to the rotation, for a full 360 degrees, of the tubular member 42. Upon cessation of pressure exerted upon the piston formed by the member 39 and ring 38, the spring 37 urges the sleeve part 22 to the position in which the flanges 32 and 33 are out of coplanar relationship with respect to the flanges 29 and 31.

Means is provided for maintaining the piston formed by the ring 38 and member 39 in a balanced position in which the flanges 32 and 33 are in a position out of coplanar relationship with respect to the flanges 29 and 31, such means specifically embodying a spring retainer ring 47 against which bears one end of a coil spring 48. The other end of the coil spring 48 bears against the inner wall of the closed end 12 of the casing 11. The ring 47 rides upon the upper ends of the cap screws 41 to bias the ring 38 and member 39 toward the open end 13 of the casing 11. The action of the spring 37 is to return the flanges 32 and 33 of the sleeve part 22 to the original position in which they are out of coplanar relationship with respect to the flanges 29 and 31 but also have their cam surfaces 34 in the path of movement of the ledges 45 on the tubular member 42 and engageable by the cooperating cam surface 46 to thereby, upon rotation of the tubular member 42, lift the flanges 32 and 33 to the upper surfaces of the ledges 45 and to thereby permit withdrawal from the casing open end 13 of the tubular member 42.

It will be seen therefor that when fluid under pressure is admitted to the casing 11 through the supply hose 19, with the tubular member 42 having its end portion inserted into the casing open end 13, full rotation of the tubular member 42 is possible and withdrawal of the tubular member 42 from the casing 11 is not possible as long as pressure is exerted upon the piston formed by the ring 38 and cup-shaped member 39.

What is claimed is:

1. A hose connector comprising a hollow casing having one end closed and the other end open, means on the closed end of said casing for attachment thereto of a hose carrying a supply of fluid under pressure, a two-part sleeve positioned within said casing and having one end adjacent and spaced from the closed end of said casing and having the other end inwardly of and adjacent the open end of said casing, one part of said sleeve being detachably and fixedly connected to the open end of said casing, a flange extending partially about said fixed one sleeve part and projecting inwardly from said fixed one sleeve part adjacent the open end of said casing, another flange extending partially about the other part of said sleeve and projecting inwardly from said sleeve other part adjacent the open end of said casing and normally positioned inwardly of and out of coplanar relationship with respect to said first-named flange, said sleeve other part being movable from the aforesaid position to a position in which said another flange is coplanar with respect to said sleeve one part flange, an annular piston positioned within said casing between said sleeve and said casing closed end and connected to said sleeve other part for movement therewith, a hollow tubular member having one end adapted to be attached to a discharge hose and having the portion adjacent the other end insertable through and withdrawable from said casing open end between the flanges on said one and other sleeve parts, said tubular member other end portion when inserted through the open end of said casing having said other end spaced from said piston with said piston sealingly engaging said tubular member other end portion and the inner wall of said casing, and a ledge extending partially about the exterior of said other end portion of said tubular member, said ledge upon insertion of said tubular member other end portion through said casing open end bearing against and shifting said sleeve other part flange to a position inwardly of and spaced from said sleeve one part flange and upon partial rotation of said tubular member causing said ledge to be wholly supported on said sleeve one part flange, said sleeve other part flange being movable to the coplanar position responsive to the pressure exerted upon said piston by the flow of fluid under pressure through said casing closed end means.

2. A hose connector comprising a hollow casing having one end closed and the other end open, means on the closed end of said casing for attachment thereto of a hose carrying a supply of fluid under pressure, a two-part sleeve positioned within said casing and having one end adjacent and spaced from the closed end of said casing and having the other end inwardly of and adjacent the open end of said casing, one part of said sleeve being detachably and fixedly connected to the open end of said casing, a flange extending partially about said fixed one sleeve part and projecting inwardly from said fixed one sleeve part adjacent the open end of said casing, another flange extending partially about the other part of said sleeve and projecting inwardly from said sleeve other part adjacent the open end of said casing and normally positioned inwardly of and out of coplanar relationship with respect to said first-named flange, said sleeve other part being movable from the aforesaid position to a position in which said another flange is coplanar with respect to said sleeve one part flange, an annular piston positioned within said casing between said sleeve and said casing closed end and connected to said sleeve other part for movement therewith, a hollow tubular member having one end adapted to be attached to a discharge hose and having the portion adjacent the other end insertable through and withdrawable from said casing open end between the flanges on said one and other sleeve parts, said tubular member other end portion when inserted through the open end of said casing having said other end spaced from said piston with said piston sealingly engaging said tubular member other end portion and the inner wall of said casing, a ledge extending partially about the exterior of said other end portion of said tubular member, said ledge upon insertion of said tubular member other end portion through said casing open end bearing against and shifting said sleeve other part flange to a position inwardly of and spaced from said sleeve one part flange and upon partial rotation of said tubular member causing said ledge to be wholly supported on said sleeve one part flange, said sleeve other part flange being movable to the coplanar position responsive to the pressure exerted upon said piston by the flow of fluid under pressure through said casing closed end means, and spring means operatively connected to said sleeve other part for urging said sleeve other part to the position in which said sleeve other part flange is in the out-of-coplanar relationship position with respect to said sleeve one part flange.

3. A hose connector comprising a hollow casing having one end closed and the other end open, means on the closed end of said casing for attachment thereto of a hose carrying a supply of fluid under pressure, a two-part sleeve positioned within said casing and having one end adjacent and spaced from the closed end of said casing and having the other end inwardly of and adjacent the open end of said casing, one part of said sleeve being detachably and fixedly connected to the open end of said casing, a flange extending partially about said fixed one sleeve part and projecting inwardly from said fixed one sleeve part adjacent the open end of said casing, another flange extending partially about the other part of said sleeve and projecting inwardly from said sleeve other part adjacent the open end of said casing and normally positioned inwardly of and out of coplanar relationship with respect to said first-named flange, said sleeve other part being movable from the aforesaid position to a position in which said another flange is coplanar with respect to said sleeve one part flange, an annular piston embodying a ring positioned within said casing between said one end of said sleeve and the closed end of said casing and an annular resilient cup-shaped member interposed between said ring and said sleeve one end, said ring and member being connected to said sleeve other part for movement therewith, a hollow tubular member having one end adapted to be attached to a discharge hose and having the portion adjacent the other end insertable through and withdrawable from said casing open end between the flanges on said one and other sleeve parts, said tubular member other end portion when inserted through the open end of said casing having said other end spaced from said ring with said cup-shaped member sealingly engaging said tubular member other end portion and the inner wall of said casing, and a ledge extending partially about the exterior of said other end portion of said tubular member, said ledge upon insertion of said tubular member other end portion through said casing open end bearing against and shifting said sleeve other part flange to a position inwardly of and spaced from said sleeve one part flange and upon partial rotation of said tubular member causing said ledge to be wholly supported on said sleeve one part flange, said sleeve other part flange being movable to the coplanar position responsive to the pressure exerted upon said ring and cup-shaped member by the flow of fluid under pressure through said casing closed end means.

4. A hose connector comprising a hollow casing having one end closed and the other end open, means on the closed end of said casing for attachment thereto of a hose carrying a supply of fluid under pressure, a two-part sleeve positioned within said casing and having one end adjacent and spaced from the closed end of said casing and having the other end inwardly of and adjacent the open end of said casing, one part of said sleeve being detachably and fixedly connected to the open end of said casing, a flange extending partially about said fixed one sleeve part and projecting inwardly from said fixed one sleeve part adjacent the open end of said casing, another flange extending partially about the other part of said sleeve and projecting inwardly from said sleeve other part adjacent the open end of said casing and normally positioned inwardly of and out of coplanar relationship with respect to said first-named flange, said sleeve other part being movable from the aforesaid position to a position in which said another flange is coplanar with respect to said sleeve one part flange and movable from the out of coplanar relationship position with respect to said sleeve one part flange to a position inwardly of and spaced from said sleeve one part flange, an annular piston positioned within said casing between said sleeve and said casing closed end and connected to said sleeve other part for movement therewith, a hollow tubular member having one end adapted to be attached to a discharge hose and having the portion adjacent the other end insertable through and withdrawable from said casing open end between the flanges on said one and other sleeve parts, said tubular member other end portion when inserted through the open end of said casing having said other end spaced from said piston with said piston sealingly engaging said tubular member other end portion and the inner wall of said casing, a ledge extending partially about the exterior of said other end portion of said tubular member, said ledge upon insertion of said tubular member other end portion through said casing open end bearing against and shifting said sleeve other part flange to a position inwardly of and spaced from said sleeve one part flange and upon partial rotation in one direction of said tubular member causing said ledge to be wholly supported on said sleeve one part flange, said sleeve other part flange being movable to the coplanar position responsive to the pressure exerted upon said piston by the flow of fluid under pressure through said casing closed end means, said sleeve other part flange and said ledge having interengaging cam surfaces, said sleeve other part flange when in the position out of coplanar relationship with respect to said sleeve one part flange having its cam surface in the path of movement in the other direction of said ledge and shiftable upon engagement of said ledge cam surface with said sleeve other part flange cam surface to the position inwardly of and spaced from said sleeve one part flange.

References Cited in the file of this patent
UNITED STATES PATENTS

| 2,595,211 | LeClair | Apr. 29, 1952 |
| 2,795,438 | Oetiker | June 11, 1957 |